United States Patent
Joseph et al.

(10) Patent No.: US 6,711,315 B1
(45) Date of Patent: Mar. 23, 2004

(54) 3-D ELECTRO OPTICAL SWITCH

(75) Inventors: Victor Joseph, Fremont, CA (US); Khalid Ahmad, Thousand Oaks, CA (US); Jie Zhou, Simi Valley, CA (US); Lei Zhang, Simi Valley, CA (US)

(73) Assignee: Avrio Technologies, Inc., Simi Valley, CA (US)

( * ) Notice: Subject to any disclaimer, the term of this patent is extended or adjusted under 35 U.S.C. 154(b) by 126 days.

(21) Appl. No.: 10/008,469

(22) Filed: Nov. 9, 2001

(51) Int. Cl.$^7$ .................................................. G02B 6/35
(52) U.S. Cl. ........................................... 385/17; 385/18
(58) Field of Search ........................... 385/16–24, 14; 398/45–51, 79, 82, 83, 85

(56) References Cited

U.S. PATENT DOCUMENTS

| | | | | |
|---|---|---|---|---|
| 4,773,721 A | * | 9/1988 | Erman et al. ................. 385/17 |
| 5,317,445 A | * | 5/1994 | DeJule et al. ................ 359/250 |
| 5,319,477 A | | 6/1994 | DeJule et al. ................. 359/42 |
| 5,345,321 A | | 9/1994 | DeJule et al. ................. 359/42 |
| 5,363,228 A | | 11/1994 | DeJule et al. ................ 359/117 |
| 5,373,393 A | | 12/1994 | DeJule et al. ................ 359/320 |
| 5,488,681 A | | 1/1996 | Deacon et al. ................ 385/37 |
| 5,515,194 A | * | 5/1996 | Kanterakis et al. ........... 398/48 |
| 5,544,268 A | | 8/1996 | Bischel et al. ................ 385/4 |
| 5,586,206 A | | 12/1996 | Brinkman et al. ............ 385/37 |
| 5,647,036 A | | 7/1997 | Deacon et al. ................ 385/27 |
| 5,852,688 A | | 12/1998 | Brinkman et al. ............ 385/16 |
| 5,937,115 A | | 8/1999 | Domash ....................... 385/16 |
| 5,953,143 A | | 9/1999 | Sharony et al. .............. 359/128 |
| 5,963,350 A | | 10/1999 | Hill ............................. 359/127 |
| 5,963,682 A | * | 10/1999 | Dorschner et al. ........... 385/16 |
| 6,167,169 A | | 12/2000 | Brinkman et al. ............ 385/4 |
| 6,385,376 B1 | * | 5/2002 | Bowers et al. ................ 385/50 |
| 6,493,483 B2 | * | 12/2002 | Gomes et al. ................ 385/24 |
| 6,549,691 B1 | * | 4/2003 | Street et al. .................. 385/18 |
| 2003/0031409 A1 | * | 2/2003 | Bellman et al. .............. 385/33 |

FOREIGN PATENT DOCUMENTS

| | | | | |
|---|---|---|---|---|
| JP | 59050689 A | * | 3/1984 | ........... H04Q/3/52 |
| JP | 04009823 A | * | 1/1992 | ........... G02F/1/313 |
| WO | WO 01/23955 A3 | | 4/2001 | |
| WO | WO 01/23955 A2 | | 4/2001 | |

* cited by examiner

*Primary Examiner*—Akm Enayet Ullah
*Assistant Examiner*—Michelle R. Connelly-Cushwa
(74) *Attorney, Agent, or Firm*—Orrick, Herrington & Sutcliffe

(57) ABSTRACT

The optical switch of the present invention advantageously comprises a three dimensional architecture capable of taking input optical signals launched in a first direction, deflecting the signals in a second direction and again in a third direction, preferably orthogonal to the first direction, with no moving parts. The signals are collected at an elevated level without passing through additional nodes. Preferably, incoming beams migrating in an x-direction along a bottom layer are steered in a z-direction to an elevated layer comprising sloped stepped mirror surfaces or a parabolic mirror surface. In an alternate embodiment, a wave guide based optical switch advantageously steers input optical signals from a bottom wave guide layer to an elevated wave guide layer via vertical coupling. The beams are then merged into a collection channel and directly coupled into output fibers without passing through additional transition or cross nodes. In another alternate embodiment, an optical switch include two identical functional plates comprising an array of identically sized and shaped transmissive blocks with stationary inclined electro-optic reflective surfaces.

18 Claims, 7 Drawing Sheets

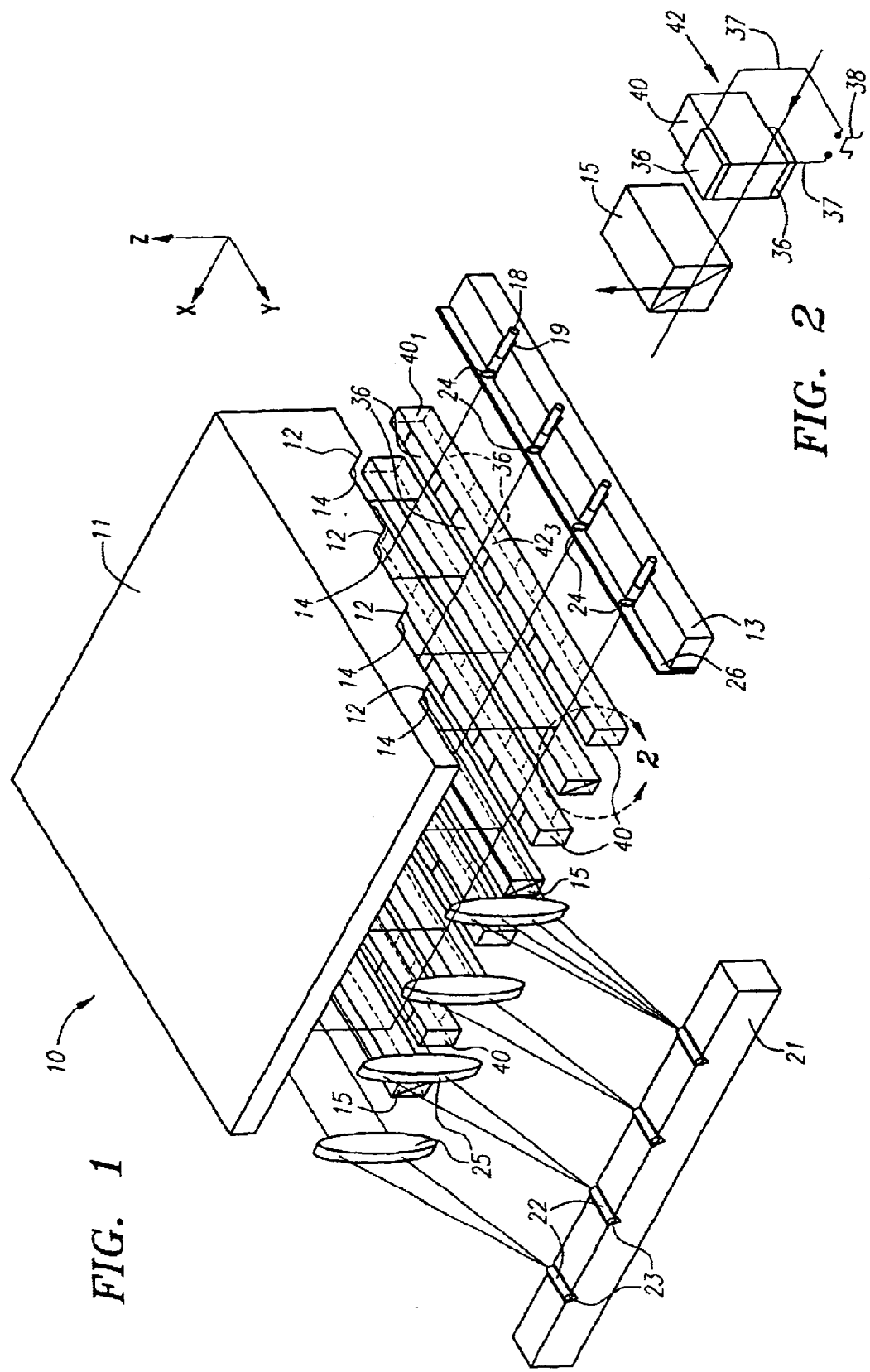

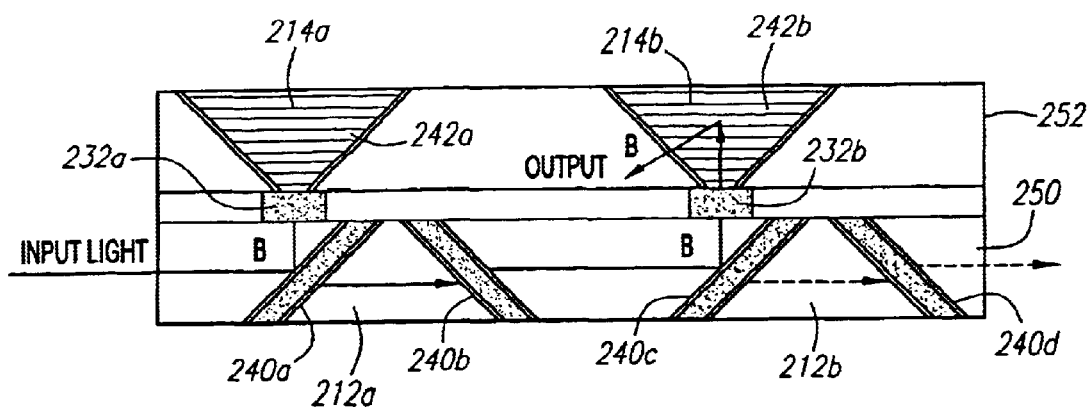
FIG. 12
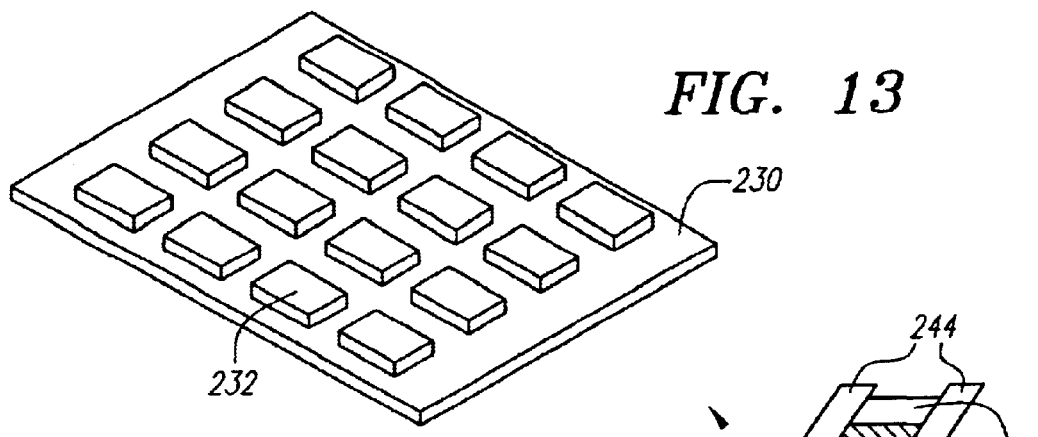
FIG. 13
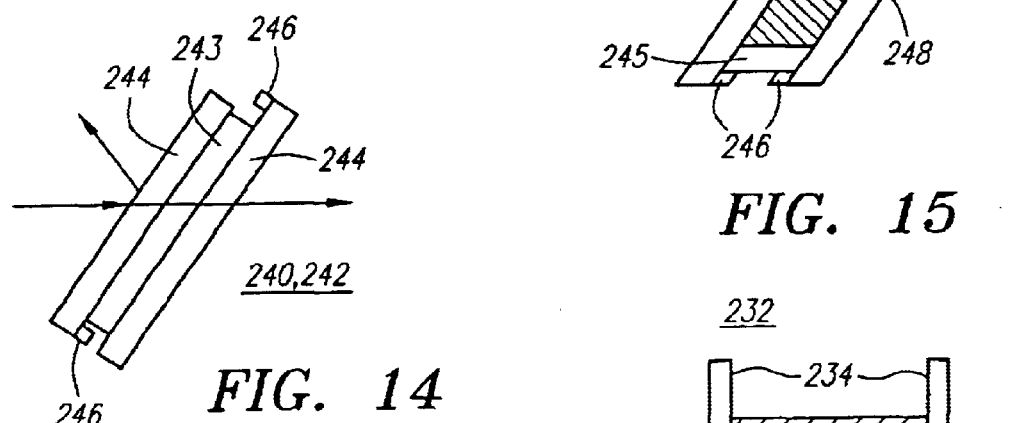
FIG. 14
FIG. 15
FIG. 16

3-D ELECTRO OPTICAL SWITCH

FIELD OF THE INVENTION

The present invention relates to optical switching systems for optical fiber communication and optical information processing systems, and more particularly to wavelength insensitive, scalable m×n optical switching networks which facilitate high capacity, high speed, high extinction ratio optical signal switching.

BACKGROUND OF THE INVENTION

The advent of the internet has prompted a tremendous surge in demand for bandwidth to accommodate large volumes of data traffic that travels through service providers' networks. Optical transmission systems potentially offer a basis for communications networks of very high capacity capable of handling such traffic. The capacity of such systems is envisioned to be used to provide internet connections for large numbers of systems to high bandwidth services such as high bit rate data communications, video on demand, video telephony, etc. A major constraint on the performance of such high capacity networks, however, is the current switching technologies. The structures of such switching networks tend to be predominately electronic and are therefore limited to capacity considerably lower than those which can be achieved in the optical domain. Typically, operation of an electronic switch in an optical domain requires that the optical signal from one of m optical input fibers be first converted to an electrical signal and then directed to any one of n output ports of the switching network by electrical circuitry. The electrical signals at the output port are then converted back into an optical signal for transmission through fiber optic cables. The conversion of the optical signal to an electric signal and then back into an optical signal, together with electrical switching circuitry, requires the use of expensive components and restricts the potential bandwidth of the communication network.

"All-optical" systems have been widely proposed for optical communication systems. In all-optical systems, the optical signals are intended to propagate in the form of light through the transmission path, the multiplex/separation circuit, logic circuits, and the like within the system while not being subject to a light to electric signal conversion or an electric signal to light conversion during the propagation. In such systems, the switches are intended to be capable of directly switching an optical signal. That is, the switches are intended to be capable of switching the optical signal from one of m optical input fibers to any one, of n optical output fibers without converting that signal to an electrical form.

Current optical switch designs have their drawbacks. For example, current two-dimensional (2-D) architecture waveguide based switches tend to require additional arrayed wave guides (AWG) and, thus, crossing nodes to couple incoming incident beams back into output fibers because the total internal angles from input ports to output ports tend to be very small. As a result, 2-D waveguide based switches tend to experience excess loss and cross talk across the additional crossing nodes, and tend to be slow in speed and expensive to manufacture. Other optical switches that employ moving parts, as in bubble technology, tend to lack reliability. Current three-dimensional (3-D) switches employing a vertical 3-D architecture tend to comprise an excessive amount of components in multiple levels and, as a result, tend to be complex to operate and very expensive and complex to manufacture. 2-D and 3-D switches based on micro electro-mechanical systems (MEMS) tend to employ a great deal of moving parts and electronic components, and inherently suffer from reliability problems, tend to have slow response times, and are complex and expensive to manufacture.

Thus, it would be desirable to provide an all-optical switch that is scalable, has low losses, provides high speed, high capacity switching at high extinction ratios, is mechanically simple, and is long lasting.

SUMMARY OF THE INVENTION

The present invention is directed to an improved optical switch having a three dimensional architecture that facilitates high speed, high capacity switching at high extinction ratios and low losses, and is mechanically simple, scalable and reliable. In one innovative aspect, the switch of the present invention advantageously takes input optical signals (incident beams) launched in a first direction, e.g., an x-direction, and then deflects the signals in a second direction, preferably 90-degrees in a z-direction, and then again in a third direction, preferably orthogonal to the first direction, i.e., 90-degrees in a y-direction, with no moving parts. After being deflected in a third direction, the signals propagate through "free space" and are advantageously directly collected into output fibers at an elevated level without passing through additional nodes and incurring additional losses.

In a preferred embodiment, the switch includes a first layer comprised of a series of (n) Faraday rotator bars interlaced with a series of (n) vertically oriented beam splitter bars. The beam splitter bars and rotator bars are oriented in parallel relation with one another and extend longitudinally along axes that are parallel to the y-axis or output axes of the switch. An array of ($n^2$) electrode pairs are selectively deposited on the top and bottom of the rotator bars to form a matrix of ($n^2$) electro-optic (E-O) or electro magneto optical (EMO) polarization rotator elements within the first layer of the switch. A second layer, positioned above the first layer and formed from a substrate such as silicon, glass, quartz or metal, and the like, preferably comprises a series of (m) 45-degree sloped stepped surfaces that extend longitudinally along axes that are parallel to the x-axis of the switch. Passive mirrors are mounted on the stepped surfaces and optically aligned with each row of the matrix of electro-optic (EO) or electro mangeto optical (EMO) rotator elements in the first layer. The switch further includes input and output channel arrays having input and output fibers and collimating, polarizing and focusing optics.

In operation, when voltage is applied to an E-O or EMO rotator element, the element shifts the phase 90-degrees of a beam incoming along an x-axis. The phase shifted beam then passes vertically through the beam splitter bar and migrates along a z-axis toward the second layer where it hits a passive mirror and is turned 90-degrees. The turned beam then migrates through free-space along the y-axis and is coupled into an output fiber after passing through a focus lens.

In an alternate embodiment, the optical switch of the present invention includes a second layer having a parabolic mirror surface formed on its underside. Output focusing optics may advantageously be eliminated because the geometry of the parabolic surface enables the beam to be directly coupled into an output fiber by a micro mirror.

In another alternate embodiment, the vertically directed beams may be locally coupled into output fibers directly above the beam splitter bars after passing through focus lenses or an array of collimating micro-lenses.

In another innovative aspect of the present invention, the switch includes a wave guide based 3-D architecture. The switch advantageously steers input incident beams, launched in a first direction along a bottom wave guide layer, to an elevated output wave guide layer via vertical coupling where the beams are steered in a second direction, which is preferably orthogonal to the first direction. The beams are then coupled to output fibers without passing through any additional transition or cross nodes and incurring additional losses.

In a preferred embodiment, the bottom or input wave guides extend the length of the switch in parallel relation along axes parallel to an x-axis. The top or output wave guides each preferably include a collection channel and a plurality of transition channels and 90-degree ramps. The collection channels extend the width of the switch in parallel relation along axes parallel to a y-axis. At each transition node in the switch, the transition sections of the output wave guide extend in the x-direction a short distance through the transition node. The transition channels are preferably located directly above the input wave guides in parallel spaced relation such that the optical field outside the input waveguides overlaps slightly with the transition channels of the output wave guides and vice versa. The transition nodes include electrodes deposited on the sides of a coupling matrix layer sandwiched between the transition channels and input wave guides. The coupling matrix preferably includes electro-optic material at the transition nodes. The refractive index of the E-O coupling layer material is preferably slightly less than the refractive index of the wave guide layers when no electric field is applied. When an electric field is applied across the electrodes, the refractive index of the coupling layer increases making vertical coupling possible. With vertical coupling, a beam propagating through an input wave guide is able to migrate to the corresponding transition channel of an output wave guide as the beam passes through the transition node. The beam then merges into the corresponding collection channel via the corresponding ramp.

In yet another innovative aspect of the present invention, the switch advantageously comprises two identical functional plates and no moving parts. The top and bottom plates each include an array or matrix of identically sized and shaped transmissive blocks. The transmissive blocks, which preferably comprise identically sized and shaped pyramids, include electrically or magnetically active inclined but stationary optically reflective surfaces, e.g. electro-optical (E-O) mirrors. When assembled, the pyramids on the top plate are preferably positioned above the pyramids on the bottom plate and appropriately shifted to orthogonally line up corresponding reflective surfaces and maintain collimation along the optical path. An intermediate layer, in the form of an optical filter to minimize cross-talk or a coupling layer to couple light beams reflected from a bottom pyramid to a top pyramid, may be sandwiched between the top and bottom plates.

In this configuration, incoming collimated and polarized light beams from input fibers are initially launched in a first direction and then steered vertically 90-degrees in a second direction by E-O mirror surfaces on the lower level transmissive blocks. The beams then propagate to an upper level where they are steered 90-degrees in a third direction by E-O mirror surfaces on the upper level transmissive blocks. The beams are then coupled back into the output fibers of the output channels. Because the plates are identical and orthogonally aligned, the switch may be operated bi-directionally.

Other aspects and features of the present invention will become apparent from consideration of the following description taken in conjunction with the accompanying drawings.

BRIEF DESCRIPTION OF THE DRAWINGS

FIG. 1 is an isometric view of a first embodiment of an optical switch of the present invention.

FIG. 2 is an isometric partial detail view, taken along line 2—2 in FIG. 1, of an electro-optic (E-O) or electro magneto optical (EMO) rotator element and a vertical beam splitter of the optical switch appearing in FIG. 1.

FIG. 12 is a partial side view of the optical switch appearing in FIG. 11.

FIG. 13 is an isometric view of an intermediate filter cell or coupling matrix cell layer of the optical switch appearing in FIG. 11.

FIG. 14 is a side view of a multi-layer reflective device of the present invention.

FIG. 15 is a side view of a birefringence material based reflective cell of the present invention.

FIG. 16 is a side view of a birefringence material based filter cell of the present invention.

DETAILED DESCRIPTION OF THE PREFERRED EMBODIMENTS

Figure 3:
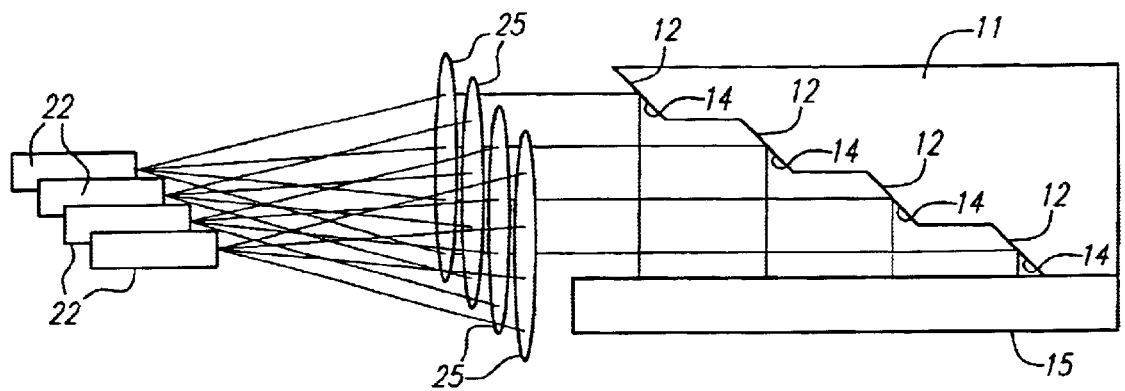
FIG. 3 is a partial side view of the optical switch appearing in FIG. 1.

Referring to FIGS. 1–3, a first embodiment of the present invention comprising an m×n three-dimensional (3-D) optical switch 10 is shown. Although scalable to accommodate a larger number of channels, the switch 10 is shown, for exemplary purposes only, as a 4×4 optical switch. As discussed in greater detail below, the switch 10 of the present invention advantageously takes input optical signals, initially launched in a first direction, e.g., an x-direction, and deflects the signals in a second direction, preferably 90-degrees in a z-direction, and then deflects the signals again in a third direction, preferably orthogonal to the first direction, i.e., 90-degrees in a y-direction, with no moving parts. The signals then advantageously pass through "free space" and are directly collected, preferably in a y-direction, in output fibers at an elevated level, without passing through any additional nodes and incurring additional losses. As a result, the switch 10 of the present invention tends to be more reliable and faster with lower insertion losses and cross talk than conventional approaches.

Referring in detail to FIG. 1, the switch 10 preferably includes a first layer comprised of a series of (n) Faraday rotator bars 40 interlaced with a series of (n) vertically oriented polarization beam splitter bars 15. The beam splitter bars 15 and rotator bars 40 are oriented in parallel spaced relation with one another and extend longitudinally along axes that are parallel to the y-axis or output axes of the switch 10. For a more compact arrangement, however, the beam splitter bars 15 and rotator bars 40 may be sandwiched together. An array of ($n^2$) electrode pairs 36, preferably in the form of a coating of Indium Tin Oxide (ITO), are selectively deposited on the top and bottom of the rotator bars 40 to form a matrix of ($n^2$) electro-optic (E-O) or electro magneto (EMO) polarization rotator elements 42 within the first layer of the switch 10. In combination with the splitter bars 15, the E-O or EMO rotator elements 42 form a matrix of beam deflection (cross) nodes. As shown in FIG. 2, electrical leads 37 connect the electrode pairs 36 to a power supply 38.

A second layer 11, positioned above the first layer and formed from a substrate such as silicon, glass, quartz or metal, and the like, preferably comprises a series of (m) 45-degree sloped stepped surfaces 12 upon which passive mirrors 14 are mounted. Alternatively, the passive mirrors 14 may be formed by polishing the sloped surfaces. The stepped surfaces 12 extend longitudinally along axes that are parallel to the x-axis or input axes of the switch 10. The mirrors 14 are optically aligned orthogonally with each row of E-O or EMO rotator elements 42 of the matrix of E-O or EMO rotator elements 42 in the first layer to maintain collimation along the optical path.

The switch 10 further includes input 16 and output 20 channel arrays. The input channel array 16 includes individual input SMF/MMF fibers 18 and collimating lenses 24 held and aligned along input axes in individual v-grooves 19 formed in an input block 13 of a switch base (not shown). A linear polarizer 26 is positioned adjacent to and extends the length of the input block 13. The output channel array 20 similarly includes individual output fibers 22 held and aligned along output axes in individual v-grooves 23 formed in an output block 21 of the switch base. Individual focus lenses 25, which extend vertically in the z-direction, are aligned with the individual output fibers 22 along output axes.

The switch base, and its input 13 and output 21 blocks, are preferably formed from a standard silicon, glass, quartz, metal, or the like, planar substrate. The rotator 40 and beam splitter 15 bars are mounted on the switch base. The switch 10 preferably includes a control signal pad (shown in regard to other embodiments below) from which electrical leads 37 extend to the electrodes 36. As such, the switch 10 tends to be easily manufactured using standard integrated circuit (IC) processes such as KOH wet etching or computer numerically controlled (CNC) machining and polishing processes to form the switch base and second layer 11. The other components, i.e., the input and output fibers 18 and 22, lenses 24 and 25, polarizer 26, rotator bars 40 and beam splitter bars 15, may be automatically inserted using automatic pick and place machines using active or passive alignment.

Figure 4:
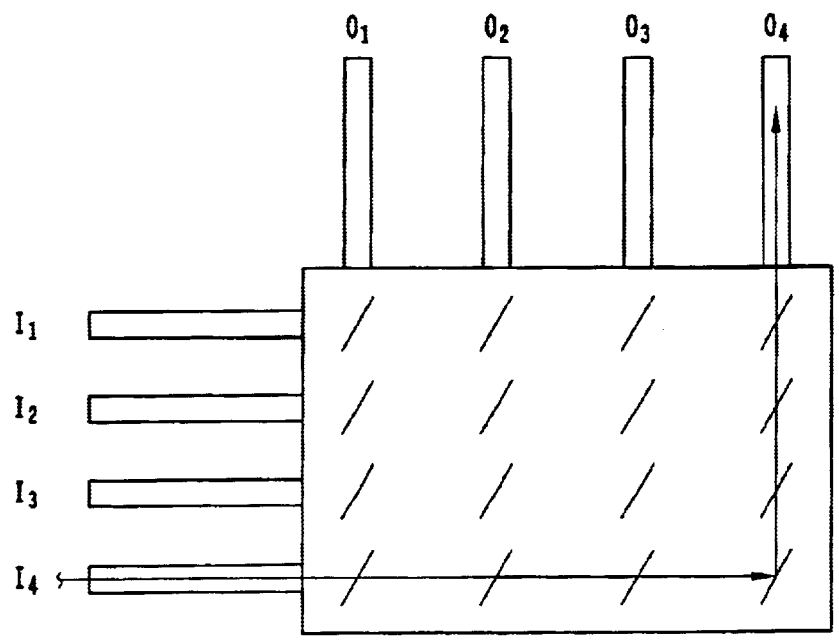
FIG. 4 is a top view of a prior art two dimensional optical switch.

In operation, a standard information carrying light signal or incident beam enters the switch 10 from an input fiber 18 and passes through a collimating lens 24 o and the linear polarizer 26, and then propagates along an input axis to the E-O or EMO polarization rotator elements 42 and vertical beam splitter bars 15. With no voltage applied, the E-O or EMO rotator elements 42 let the beam pass through and act as a waveguides. When voltage is applied to an E-O or EMO rotator element 42, the E-O or EMO rotator element 42 shifts the phase of the incident beam preferably 90-degrees. The phase-shifted beam passes through the polarized beam splitter 15 vertically in a z-direction. The beam then hits the 45 degree sloped mirror surface 14 which turns or deflects the beam 90-degrees in the y-direction. The beam then migrates through free space and is advantageously coupled directly back into an output fiber 22, after passing through a focusing lens 25, without passes through any additional cross-nodes. As shown in FIG. 4, the same operation in a 2-D switch would require the beam to cross additional nodes resulting in additional losses and cross talk. Further, because of cross coupling problems at the additional intercepting nodes, the output beam quality tends to be poor compared with the output beams produced by the architecture of the switch 10 of the present invention.

As FIG. 1 illustrates, the E-O or EMO rotator elements 42 of the Faraday rotator bars 40 are referenced to specific input channels $I_m$ and output channels $O_n$. For instance, to direct an incoming incident beam from the third input channel $I_3$ to the first output channel $O_1$, the electrodes 36 on the third rotator element $42_3$ of the first Faraday rotator bar $40_1$ are turned on by a switch signal control unit (not shown). The incident beam is phase shifted 90-degrees by rotator element $42_3$ and then vertically steered as it travels through the adjacent beam splitter bar 15 toward the mirror 14 above where it is steered back 90-degrees in the y-direction. Turning the beam 90-degrees from the x-direction to the z-direction, and then from the z-direction to the y-direction tends to greatly simplify coupling of the beam to output fibers. With no moving parts, the response time of the switch 10 tends to approach the speed of the E-O or EMO rotator elements 42 and beam splitter/deflector bars 15. For some E-O or EMO polymers the speed approaches 100 GHz, and for certain doped and undoped $LiNbO_3$ crystal, BBO or SBN or PLZT based E-O or EMO rotators the speed approaches 5 nanoseconds and micro-seconds for beam splitter/deflectors.

Figure 5:
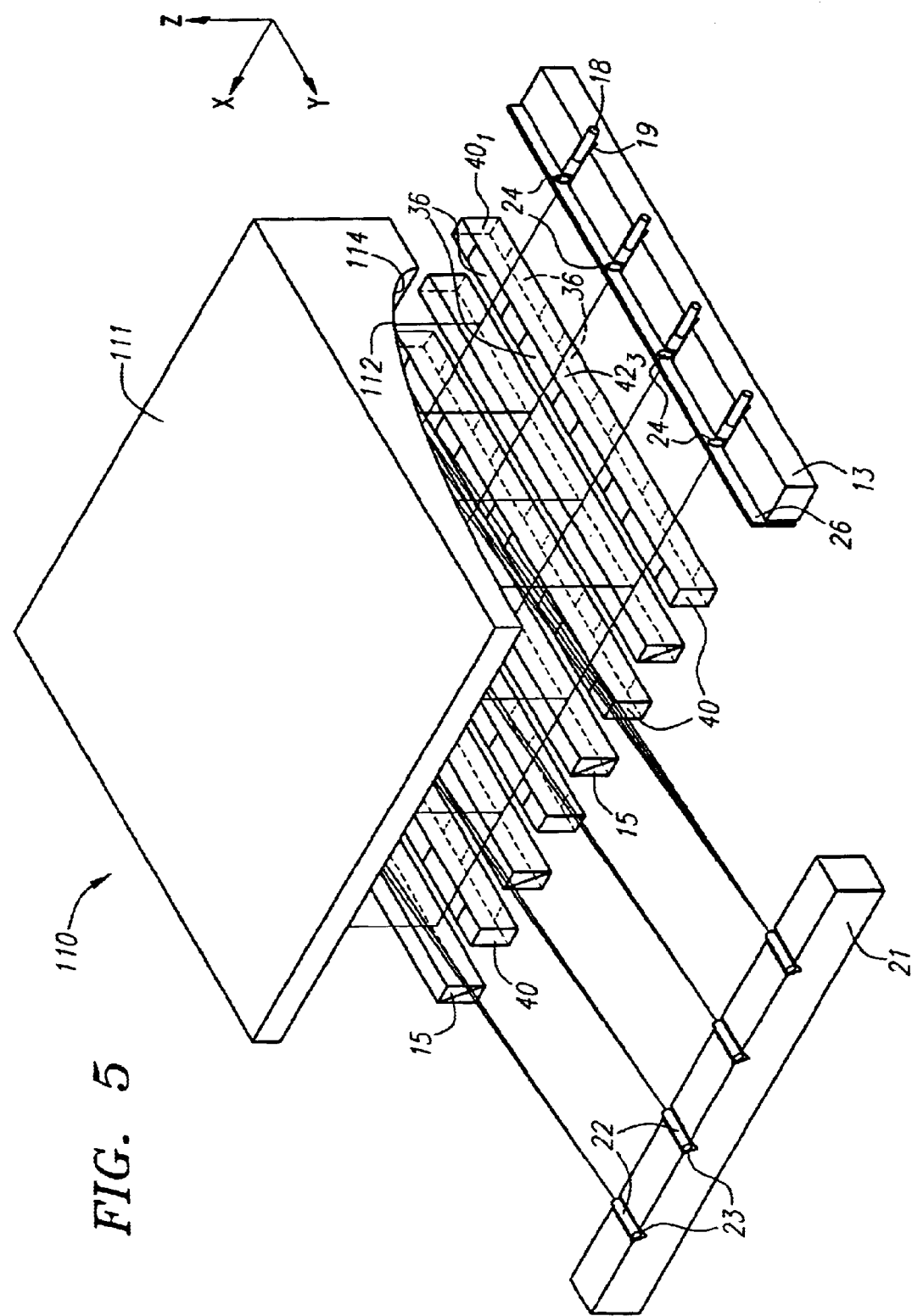
FIG. 5 is an isometric view of a second embodiment of the optical switch of the present invention.

An alternate embodiment of the optical switch of the present invention is shown in FIG. 5. All like components remain as numbered in FIG. 1. In this embodiment, the optical switch 110 utilizes a second layer 111 having a parabolic surface 112 formed on its underside instead of stepped surfaces. The parabolic surface 112 is polished to form a passive mirror 112. The focus lenses 25 in FIG. 1 may advantageously be eliminated because the geometry of the parabolic mirror 114 enables focussing a beam turned in the y-direction directly into an output fiber 22.

In operation, a standard information carrying light signal or incident beam enters the switch 110 from an input fiber 18 and passes through a collimating lens 24 and the linear polarizer 26, and then propagates along an input axis to the E-O or EMO polarization rotator elements 42 and vertical beam splitter bars 15. With no voltage applied, the E-O or EMO rotator elements 42 let the beam pass through and act as a waveguides. When voltage is applied to an E-O rotator element 42, the rotator element 42 shifts the phase of the incident beam preferably 90-degrees. The phase-shifted beam passes through the polarized beam splitter 15 vertically in a z-direction to the parabolic mirror 114 above. The beam hits the parabolic mirror 114, which turns and directs the beam in an output direction preferably orthogonal to the input axes, e.g., the y-direction. The beam is advantageously coupled directly back into an output fiber 22 without passing through a focusing lens or through any additional cross-nodes.

Like the previous embodiment, the E-O or EMO rotator elements 42 of the Faraday rotator bars 40 are reference to specific input channels $I_m$ and output channels $O_n$. For instance, to direct an incoming incident beam from third input channel $I_3$ to the first output channel $O_1$, the electrodes 36 on the third rotator element $42_3$ of the first Faraday rotator bar $40_1$ are turned on by a switch signal control unit (not shown). The incident beam is phase shifted 90-degrees by the third rotator element $42_3$ and then vertically steered as it travels through the adjacent beam splitter bar 15 toward the parabolic mirror 114 above where it is steered back in the y-direction.

In another alternate embodiment (not shown), a series of (m) pairs of electro optic Faraday rotator bars and horizontal beam splitter bars oriented in stepped fashion and extending longitudinally along axes that are parallel to the x-axis or input axes of the switch are positioned above the first layer in place of the passive mirrors 14 and parabolic mirror 114 of the previous embodiments. Like the rotator bars 40 in the first layer of the first and second embodiments above, the rotator bars include an array of ($n^2$) electrode pairs selectively deposited on the rotator bars to form a matrix of ($n^2$) electro-optic or electro magneto optical rotators. In operation, a beam steered vertically by an E-O or EMO rotator element and corresponding beam splitter bar on the first layer, may be turned 90-degrees in the y-direction when a voltage is applied to the electrodes of the appropriate elevated E-O or EMO rotator element. The beam is then coupled directly into an output fiber after passing through a focusing lens without passing through additional nodes. However, if a voltage or current is not applied to an elevated E-O or EMO rotator, the vertically steered beam may be collected locally in output fibers positioned above the elevated beam splitter bars.

Figure 6:
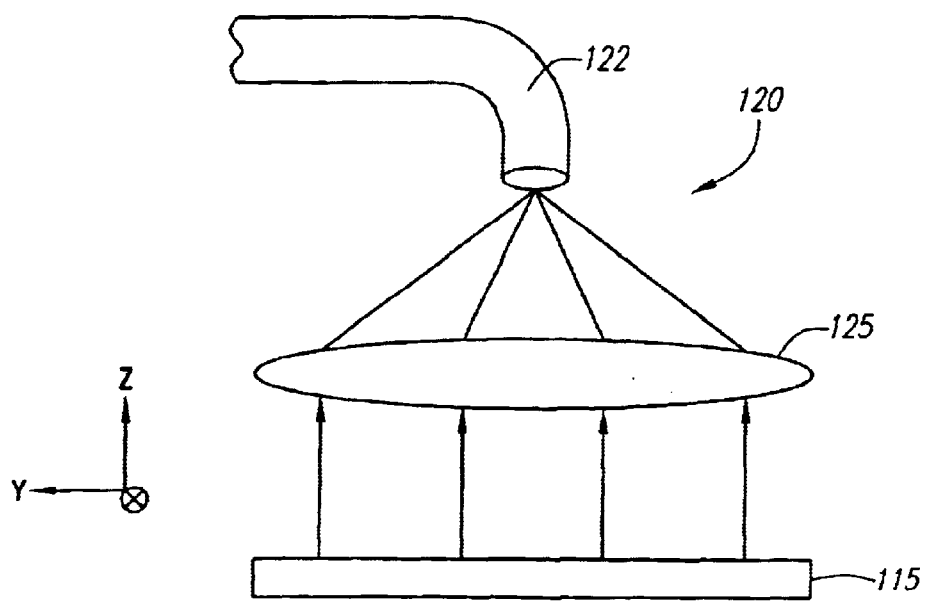
FIG. 6 is a partial side view of a third embodiment of the optical switch of the present invention.
Figure 7:
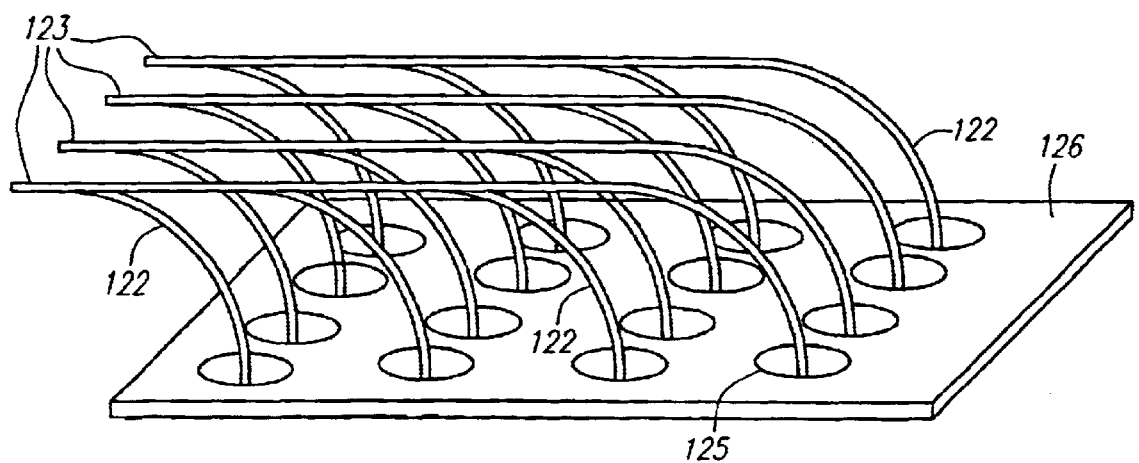
FIG. 7 is a partial side view of a fourth embodiment of the optical switch of the present invention.

In other embodiments of the present invention shown in FIGS. 6 and 7, the optical switches 120 and 130 preferable do not include a second or elevated layer that comprises passive mirrors or other optically reflective devices. Vertically directed beams are preferably collected locally and coupled into output fibers directly above the beam splitter bars. As shown in FIG. 6, the switch 120 preferably includes a focus lens 125 positioned directly above a polarization beam splitter bar 115 to direct vertically steered beams from the beam splitter bar 115 into an output fiber 122. Alternatively, as shown in FIG. 7, a micro-lens array 126 is positioned at an elevated level with individual micro-lenses 125 aligned with the polarization beam splitter bars. Vertically steered beams are preferably directed into output fibers 122 by the micro-lenses 125. The beams collected into individual output fibers 122 may be combined in fiber combiners 123.

Figure 8:
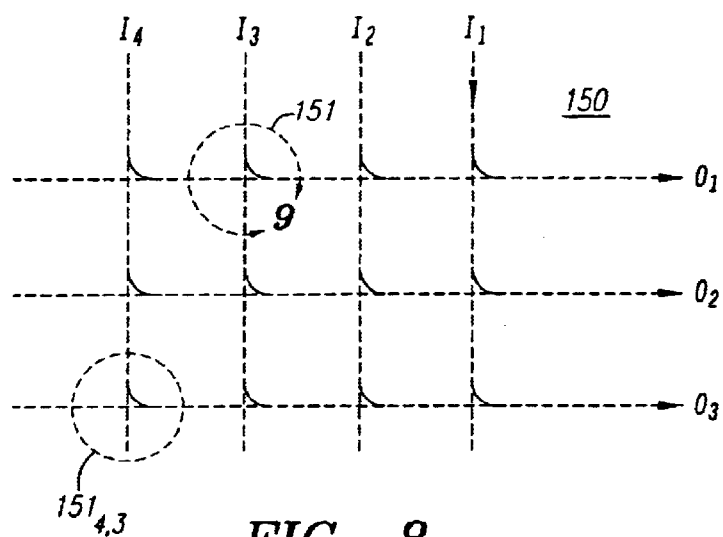
FIG. 8 is a schematic diagram of a fifth embodiment of the optical switch of the present invention.
Figure 9:
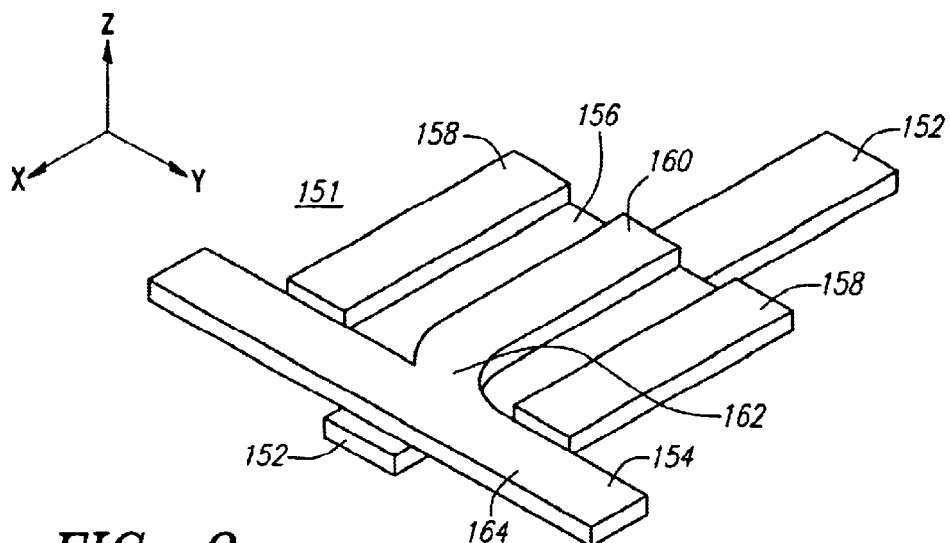
FIG. 9 is an isometric partial detail view, taken along line 9—9 in FIG. 8, of a transition node of the optical switch appearing in FIG. 8.
Figure 10:
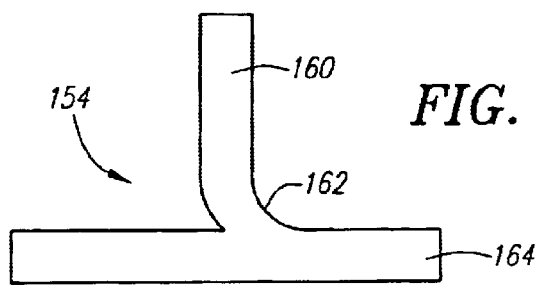
FIG. 10 is a top view of an output wave guide of the optical switch appearing in FIG. 8.
Figure 11:
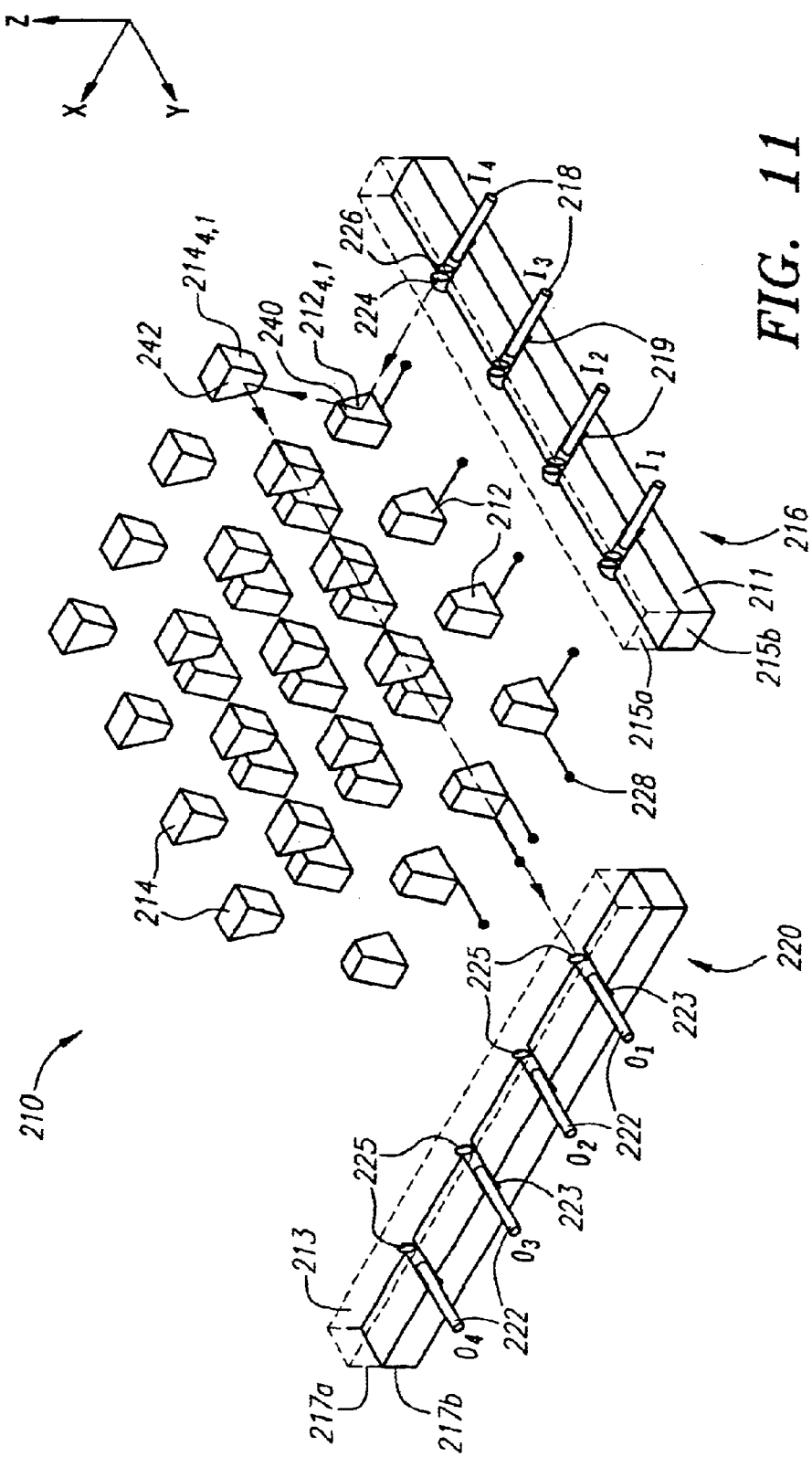
FIG. 11 is an isometric view of a sixth embodiment of the optical switch of the present invention.

Turning to the FIGS. 8–10, another embodiment of the present invention comprising a wave guide based, m×n 3-D optical switching device 150 is shown. The switch 150 preferably comprises three layers; a bottom layer comprising input wave-guide channels 152, a top layer comprising output wave-guides 154, and an intermediate layer comprising a coupling layer 156. The top and bottom wave guides 152 and 154 are preferably identical in thickness and width, and are preferably fabricated on a silicon substrate. The wave-guide materials may be E-O materials, such as polymers and semiconductors, or any other fabricatable material. The bottom or input wave guide channels 152 extend the length of the switch 150 in parallel relation in the x-direction as shown in FIG. 8. The top or output wave guides 154, as shown in detail in FIGS. 9 and 10, include transition channels 160, 90-degree ramps 162, and a collection channel 164. The collection channels 164 of the output wave guides 154 extend the width of the switch 150 in parallel relation in the y-direction as shown in FIG. 8. At each transition node 151, the transition channels 160 of the output wave guides 154 extend in the x-direction a short distance through the transition nodes 151. The transition channels 160 are located directly above the input wave guides 152 in parallel spaced relation such that the optical field outside the transition channels 160 overlaps slightly with the input wave guides 152, and vice versa.

The transition nodes 151 include electrodes 158, preferably thin layers of Cr or Au, deposited on the sides of the coupling matrix layer 156, which preferably includes E-O material at the transition nodes 151. The electrodes 158 may be applied to the wave guides 152 and 154 if the wave guide material is E-O. The refractive index of the coupling layer 156 is preferably slightly less than the refractive index of the wave guide layers 152 and 154 when no electric field is applied. When an electric field is applied across the electrodes 158, the refractive index of the coupling layer 156 increases and approaches the refractive index of the wave guide layers 152 and 154 making vertical coupling possible. With vertical coupling, a beam propagating through an input wave guide channel 152 is able to vertically migrate to a corresponding transition channel 160 of an output wave guide 154 as it passes through a transition node 151.

In operation, in the absence of an applied electric field, an incoming collimated incident light beam launched in the x-direction along an input wave guide 152 will simply continue to travel along the input wave guide 152. However, when an electric field is applied at a transition node 151, an incoming collimated incident light beam launched in the x-direction along an input wave guide channel 152 will be coupled vertically and migrate up to the corresponding transition channel 160 of an output wave guide 154. The vertically steered beam is then merged into the collection section 164 of the output wave guide 154 via a ramp 162 and coupled into an output fiber by a collimating lens without passing through any additional transition or cross nodes and incurring additional losses.

When the optical switch 150 is in full operation, the transition nodes are referenced to the input ($I_{1-4}$) and output ($O_{1-4}$) ports. For example, in order to direct an incoming incident light beam from the fourth input ports $I_4$ to the third output ports $O_3$, the electrodes 158 at transition node $151_{4,3}$ must be activated.

Referring in detail to the FIGS. 11–16, yet another embodiment of the present invention comprising an m×n 3-D optical switching device 210 is shown. Although scalable to accommodate a larger number of channels, the switch 210 is shown, for exemplary purposes only, as a 4×4 optical switch. The switch 210, which advantageously comprises no moving parts, preferably comprises two identical functional plates, top substrate 213 and bottom substrate 211, each comprising an array or matrix of identically sized and shaped transmissive blocks 214 and 212. For clarity, only the input channel blocks 215a and 215b and output channel blocks 217a and 217b of the top and bottom substrates 213 and 211 are shown. The transmissive blocks 214 and 212, which preferably comprise identically sized and shaped pyramids; include electrically or magnetically active inclined but stationary optically reflective surfaces 240 and 242, e.g. electro-optical (E-O) or electro magneto optical (EMO) mirrors. When assembled, the pyramids 214 on the top plate 213 are preferably positioned above the pyramids 212 on the bottom plate 211 and appropriately shifted to orthogonally line up reflective surfaces 240 and 242 to maintain collimation along the optical path (see also FIG. 12). An intermediate layer 230, in the form of an optical filter to minimize cross-talk or a coupling layer to couple light beams reflected from a bottom pyramid 212 to a top pyramid 214, may be sandwiched between the top and bottom plates 213 and 211 (see FIG. 12). A control signal pad 228 having electrical traces 229 leading to each of the E-O or EMO mirrors 240 and 242 may be formed on each of the top and bottom substrates 213 and 211.

The switch 210 also includes input and output channel arrays 216 and 220. The input channel array 216 includes an individual input fiber 218 for each input channel $I_1$, $I_2$, $I_3$, and $I_4$. The input fibers 218 are held and aligned along the x-axis in silicon v-grooves 219 formed in the input channel blocks 215a and 215b of the top and bottom substrates 213 and 211. Each input channel $I_1$, $I_2$, $I_3$, and $I_4$ also includes a collimating lens 224 and polarization beam splitter 226 held in position in the v-grooves 219. The output channel array 220 includes an output fiber 222 for each output channel $O_1$, $O_2$, $O_3$, and $O_4$, held and aligned along the y-axis in silicon v-grooves 223 formed in the output channel blocks 217a and 217b of the top and bottom substrates 213 and 211. A collimating lens 224 is also held in each of the v-grooves 223 corresponding to each of the output channels $O_1$, $O_2$, $O_3$, and $O_4$.

In this configuration, incoming collimated and polarized light beams from input fibers 218 are initially launched along the x-axis and then steered vertically 90-degrees along the z-axis by E-O or EMO mirror surfaces 240 on the lower level transmissive blocks 212. The beams then propagate to an upper level where they are steered 90-degrees along the y-axis by E-O or EMO mirror surfaces on the upper level transmissive blocks 214. The beams are then coupled back into the output fibers 222 of the output channels $O_1$, $O_2$, $O_3$, and $O_4$. When the optical switch 210 is operating, each matrix element or transmissive block 214 and 212 is specifically referenced to the input and output channels. For example, if an incident beam from the fourth input channel 14 is desired to be directed to the first output channel $O_1$, a switch signal control unit (not shown) will direct electric current through the electric control pad 228 to activate the reflective surfaces 240 on transmissive block $212_{4,1}$ and reflective surface 242 on transmissive block $214_{4,1}$ at the same time. Because the top and bottom plates 213 and 211 are identical and the corresponding reflective surfaces 240 and 242 are orthoganally aligned, the switch 210 may be operated bi-directionally. Further, because there are no moving parts, the response time of the switch 210 may be on the order of pico/nanoseconds to milliseconds depending upon the type of material used to form the electrically or magnetically active optically reflective surfaces 240 and 242. Semiconductor optical amplifier material may be used to fill the gap between transmissive blocks 214 and 212 to reduce losses due to the beams passing through additional transmissive blocks (cross-nodes) 214 and 212 as they propagate from input to output ports.

The optical switch 210 is preferably formed using electrically and/or magnetically controlled birefringence material or any other material whose refractive index can be affected by applying an electric or magnetic field. The birefringence material is used to form the E-O or EMO mirror reflective surfaces 240 and 242 at each cross point of the matrix of transmissive blocks 214 and 212 on each of the upper and lower plates 213 and 211. When a light signal is to be directed from a particular input channel to a particular output channel, voltage is applied to the appropriate E-O or EMO mirrors 240 and 242 at the chosen reflection points along the top and bottom plates at the same time 211 and 213. The refractive index change caused by application of the electric or magnetic field will steer the beam in the appropriate direction by total internal reflection or multiple layer reflection as discussed in greater detail below.

Turning to FIG. 12, the reflective surfaces 240 and 242, specifically surfaces 240a and 242a and surfaces 240c and 242b, are orthoganally aligned. An input incident light beam B propagates in the medium 250 after passing through collimating and polarization optics. When enough electric or magnetic field is applied across the appropriate reflective layers 240 and 242 in the top and bottom plates 213 and 211, the beam B may be deflected 90-degrees to travel vertically up by a reflective layer 240 in the bottom plate 211 and then back 90-degrees by a reflective layer 242 in the top plate 213. The beam B then propagates through the medium 252 and couples with output optics. If an intermediate filter matrix layer 230 is sandwiched between the top and bottom plates 213 and 211, the beams will pass through the filter cells 232 if sufficient electric or magnetic field is applied to the appropriate filter cell 232 as discussed below. Without an applied field, the incident beam B can pass through the switch 210 unreflected. For example, when no field is applied to reflective surfaces 240a and 240b on transmissive block 212a, the incident beam B passes through transmissive block 212a and continues to propagate through medium 250. The opposing surface of a transmissive blocks 212 and 214, in this instance opposing surface 240b of transmissive block 212a, preferably function as collimating compensators as the beams B pass through the transmissive blocks 212 and 214. With enough electric or magnetic field applied across the reflective layer 240c on transmissive block 212b, the reflective surface 214b of transmissive block 242b of the top plate 213, and the filter cell 232b, the incident light beam B is steered 90-degrees or vertically upward from reflective surface 240c through filter cell 232b and orthoganally back relative to the input axis from reflective surface 242b.

The reflective surfaces or electro-optic mirrors 240 and 242 of the present invention may comprise a multilayer reflective device as shown in FIG. 14. The reflective device preferably includes an electro-optic material 243 sandwiched between two transparent conductive layers 244. The reflective index of the electro-optic material 243 can be controlled by applying an electric or magnetic field across electrodes 246 attached to the conductive layers 244. Without an applied field, the incident beam can pass through the multi-layer device 240 and 242 if the refractive index of the electro-optic material 243 and the transparent conductive layers 246 are matched. However, when a field is applied the refractive index of the electro-optic material changes from high to low resulting in an increase of beam reflection. High reflectivity can be reached by increasing the number of layers. For example, as pointed out in Borne, et al., "Principles of Optics; Propagation in Periodically Stratified Media," in the case of normal incidents, the basic three layer HLH device has a reflectivity of 0.672 at the center frequency. For a five layer stack, reflectivity is 0.856, a seven layer stack the reflectivity is 0.945, and for a nine layer stack the reflectivity is 0.984, etc. To reduce cross talk anti-reflection coatings, such as MgF and PbF, may be deposited on the top of the HLH film stack or the inclined surfaces of the pyramids 212 and 214.

As shown in FIG. 15, the reflective surfaces or electro-optic mirrors 240 and 242 of the present invention may alternatively comprise a reflective layer device comprising a polymer, a liquid crystal, or a polymer dispersed based birefringence material 248 sandwiched between two transparent conductive layers 244. Spacers 245, preferably comprised of an insulator material, are positioned above and below and on the sides of the birefringence material 248. Without an applied field, the incident beam can travel through the device 240 and 242. With an applied field, the refractive index of the birefringence material 248 changes from high to low resulting in the total internal reflection of an incident beam if directed at an appropriate angle for a particular material.

As shown in FIG. 16, a similar device to the reflective layer device shown in FIG. 15 may be used as an optical filter 232 for incoming beams at normal incidents. For example, the cell of polymer dispersed liquid crystals 238 becomes transparent and allows beams to pass through only with the application of enough electric or magnetic field. As shown in FIG. 13, the filter cells 232 (or optionally coupling matrix cells) are arranged in a matrix on the intermediate layer 230. When the intermediate layer 230 is assembled within the switch 210 sandwiched between the top and bottom plates 213 and 211, the filter cells 232 are aligned between corresponding reflective surfaces, e.g. surface 240a on transmissive block 212a and surface 242a on transmissive block 214a as shown in FIG. 12.

Because the top and bottom plates 213 and 211 and corresponding transmissive blocks 214 and 212 are identical, they are advantageously easily massed produced. For example, the substrates 211 and 213, which may be made of quartz, silicon or any transparent material for a given wavelength, may be manufactured into final form using standard integrated circuit (IC) manufacturing processes, such as KOH wet etching, using mask sets defining the size and shape of each pyramid 214 and 212 and spacing between them. With final polishing, the reflective surfaces 240 and 242 may be formed to any desired angle. Alternatively, the plates 213 and 211 and corresponding transmissive blocks 214 and 212 may be formed by standard mechanical processes using single point diamond headed computer-numeric-control (CNC) machines, which are capable of producing inclined surfaces on the transmissive blocks 214 and 212 of any desired angle, followed by polishing of the inclined surface. Both processes are robust, repeatable and reliable. The reflective layers 240 and 242 may be selectively deposited on the incline surfaces of the transmissive blocks 214 and 212 using standard IC or other recommended manufacturing processes for commercially available materials. Other components of the switch 210 may be assembled on the switch 210 using high volume, high precision pick-and-place machines.

While the invention is susceptible to various modifications and alternative forms, specific embodiments thereof have been shown in the drawings and are herein to described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. An optical switch comprising:
   a plurality of input channels,
   a plurality of output channels at an elevated level relative to the plurality of input channels,
   first and second layers, the first layer comprising a plurality of Faraday rotator bars interlaced with a plurality of vertical beam splitter bars in parallel orientation along axes that are parallel to output axes of the plurality of output channels,
   a matrix of deflection nodes on the first layer to deflect incoming incident beams traveling in a first direction from the plurality of input channels in a second direction toward the second layer, and
   a plurality of deflection elements on the second layer to deflect the beams In a third direction through free space toward the plurality of output channels.

2. The switch of claim 1, further comprising an array of electrodes deposited on the plurality of Faraday bars to form a matrix of electro-optic or electro magneto optical rotator elements each having a first mode in which the beams freely pass therethrough and a second mode in which the beams are phase shifted 90-degrees.

3. An optical switch comprising:
   a plurality of input channels,
   a plurality of output channels at an elevated level relative to the plurality of input channels,
   first and second layers,
   a matrix of deflection nodes on the first layer to deflect incoming incident beams traveling in a first direction from the plurality of input channels in a second direction toward the second layer, and
   a plurality of deflection elements on the second layer to deflect the beams In a third direction through free space toward the plurality of output channels, the deflection elements comprising a plurality of passive mirrors positioned along a plurality of stepped surfaces on the underside of the second layer.

4. The switch of claim 3, wherein the plurality of stepped surfaces are sloped at a 45-degree angle.

5. The switch of claim 1, wherein each input channel comprises an input fiber and a collimation lens aligned along an input axis.

6. The switch of claim 5, wherein the input fiber and collimation lens are held within a V groove formed in an input block of a switch base.

7. The switch of claim 6, further comprising a linear claim polarizer positioned adjacent claim to and extending along the length of the input block.

8. The switch of claim 7, wherein each of the plurality of output channels comprises an output fiber held and aligned along an output axis within a V groove formed in an output block of the switch base.

9. The switch of claim 8, further comprising a plurality of focus lenses aligned along the output axes of the plurality of output channels.

10. An optical switch comprising
    a first layer having a plurality of input wave guide channels extending in parallel orientation along input axes,
    a second layer comprising a plurality of output wave guides, each output wave guide comprising a collection channel, a plurality of transition channels, and a plurality of ramps connecting the plurality of transition channels with the collection channel, the collection channel of each of the plurality of output wave guides extending in parallel orientation along output axes, the plurality of transition channels extending from the collection channel along the input axes in parallel orientation with the plurality of input wave guide channels, and
    a coupling matrix layer interposing each of the plurality of transition channels and the plurality of input wave guide channels forming a matrix of transition nodes, wherein the coupling matrix layer at each transition node comprises an electro-optical material.

11. The switch of claim 10, further comprising a pair of electrodes connected to opposing sides of the coupling matrix layer at each transition node.

12. The switch of claim 11, wherein the refractive index of the coupling matrix layer is less than the refractive index of each of the plurality of input wave guide channels and transition channels when no electric field is applied and increases when an electric field is applied allowing vertical coupling of an incident beam migrating through an input wave guide channel to a transition channel.

13. An optical switch comprising
first and second identical functional plates comprising a matrix of transmissive blocks having stationary inclined reflective surfaces, the second plate being positioned above and appropriately shifted to orthogonally align the reflective surfaces of the first and second plates,
a plurality of input fibers aligned along input axes and optically coupled to the reflective surfaces of the first plate, and
a plurality of output fibers positioned at an elevated level relative to the plurality of input fibers and aligned along output axes that are orthogonal to the input axes, the plurality of output fibers being optically coupled to the reflective surfaces of the second plate.

14. The switch of claim 13, wherein the reflective surfaces of the first and second plates comprise an electro-optical material.

15. The switch of claim 13, wherein the reflective surfaces comprise a multi layer electro-optical reflective device.

16. The switch of claim 13, further comprising an intermediate layer sandwiched between the first and second plates.

17. The switch of claim 16, wherein the intermediate layer comprises an array of filter cells or coupling matrix cells.

18. The switch of claim 13, wherein the reflective surfaces of the first and second plates comprise an electro magneto optical material.

* * * * *